(12) United States Patent
Robertson et al.

(10) Patent No.: US 12,469,611 B2
(45) Date of Patent: Nov. 11, 2025

(54) REACTOR CONTROL DEVICE

(71) Applicant: Rolls-Royce SMR Limited, Derby (GB)

(72) Inventors: Daniel Robertson, Derby (GB); Brett Longstaffe, Derby (GB)

(73) Assignee: Rolls-Royce SMR Limited, Derby (GB)

(*) Notice: Subject to any disclaimer, the term of this patent is extended or adjusted under 35 U.S.C. 154(b) by 276 days.

(21) Appl. No.: 17/913,356

(22) PCT Filed: Mar. 26, 2021

(86) PCT No.: PCT/EP2021/057873
§ 371 (c)(1),
(2) Date: Sep. 21, 2022

(87) PCT Pub. No.: WO2021/191407
PCT Pub. Date: Sep. 30, 2021

(65) Prior Publication Data
US 2023/0162874 A1 May 25, 2023

(30) Foreign Application Priority Data
Mar. 27, 2020 (GB) ...................... 2004454

(51) Int. Cl.
*G21C 7/26* (2006.01)
*G21C 7/06* (2006.01)
*G21C 9/033* (2006.01)
(52) U.S. Cl.
CPC ............... *G21C 7/26* (2013.01); *G21C 7/06* (2013.01); *G21C 9/033* (2013.01)

(58) Field of Classification Search
CPC ............... G21C 7/26; G21C 7/27; G21C 7/32
See application file for complete search history.

(56) References Cited

U.S. PATENT DOCUMENTS 2,999,059 A * 9/1961 Treshow ................. G21C 7/26
376/350
3,183,168 A 5/1965 Bell
(Continued)

FOREIGN PATENT DOCUMENTS

GB 1029712 A 5/1966
GB 1117315 A 6/1968
(Continued)

OTHER PUBLICATIONS

UKIPO Search & Examination Report, Application No. GB2004454. 1, dated Jan. 26, 2021, 8 pages.
(Continued)

*Primary Examiner* — Sharon M Davis
(74) *Attorney, Agent, or Firm* — Quarles & Brady LLP

(57) ABSTRACT

A reactor control system for a nuclear reactor, the reactor control system comprising: one or more hollow tubes comprising neutron absorbing material, each having a first end and a second end; a pump connected to the first end of each hollow tube and operable to control the amount of a first fluid within the hollow tube, the first fluid comprising a neutron moderator, wherein: the pump is controlled based on a level of reactivity in the nuclear reactor, and the second end of the hollow tubes is in fluid communication with a second fluid, the second fluid having a neutron moderating capacity lower than 10% of that of the first fluid.

12 Claims, 8 Drawing Sheets

(56) References Cited

U.S. PATENT DOCUMENTS

| | | | | | |
|---|---|---|---|---|---|
| 3,212,984 | A | * | 10/1965 | Tollet | G21C 7/26 376/209 |
| 3,510,399 | A | | 5/1970 | Shoichi et al. | |
| 2012/0288048 | A1 | * | 11/2012 | Mann | G21C 7/22 376/327 |

FOREIGN PATENT DOCUMENTS

| | | | |
|---|---|---|---|
| GB | 1126367 | A | 9/1968 |
| JP | S54125391 | A | 9/1979 |
| JP | 2013047633 | A | 3/2013 |
| KR | 20120029694 | A | 3/2012 |

OTHER PUBLICATIONS

International Search Report and Written Opinion, International Application No. PCT/EO2021/057873, dated Aug. 4, 2021, 6 pages.
Magdi Ragheb, "Nuclear Naval Propulsion", Sep. 9, 2011, 40 pgs, available at https://www.intechopen.com/chapters/19667.
Notice of Reasons for Refusal for Japanese Application No. 2022-558244, dated Nov. 15, 2025, 3 pages.

* cited by examiner

REACTOR CONTROL DEVICE

RELATED APPLICATIONS

This application is a 35 U.S.C. § 371 national phase application of PCT/EP2021/057873 (WO-2021/191407 A1), filed on Mar. 26, 2021, entitled "REACTOR CONTROL DEVICE", and claims priority to GB-2004454.1, filed on Mar. 27, 2020, which are incorporated herein by reference in their entirety.

TECHNICAL FIELD

The present disclosure relates to nuclear reactors.

BACKGROUND

Nuclear power plants convert heat energy from the nuclear fission of fissile material contained in fuel assemblies in a nuclear reactor into electrical energy. Nuclear reactors require fissile fuel, and moderators to condition released neutrons to increase the rate of fissions. They also require a control mechanism to reduce neutron flux to control the rate of fission when required.

Nuclear reactors may have a moderator to slow neutrons to increase the collision cross section of neutrons with the selected fuel. Water moderated reactors use light or heavy water as a moderator. A light water reactor (LWR) is a nuclear reactor that uses normal water as both coolant and neutron moderator. Known types of light water reactors include boiling water reactors (BWR) and pressurised water reactors (PWR). Heavy Water Reactors (HWR) use water with an increased deuterium content, as deuterium has a lower absorption cross section, permitting the use of fuel with a lower fissile content.

Pressurised water reactor (PWR) nuclear power plants have a primary coolant circuit which typically connects the following pressurised components: a reactor pressure vessel (RPV) containing the fuel assemblies; one or more steam generators; and a pressuriser. Coolant pumps in the primary circuit circulate pressurised water through pipework between these components. The RPV houses the nuclear core which heats the water in the primary circuit. The steam generator functions as a heat exchanger between the primary circuit and a secondary system where steam is generated to power turbines. The pressuriser maintains a pressure of around 155 bar in the primary circuit.

Boiling water reactor (BWR) nuclear power plants differ primarily from pressurised water reactors in that steam is generated in the reactor vessel from the same water circuit that is used as both a coolant and a moderator, and this steam is used directly to drive a turbine. Boiling water reactors therefore do not require a steam generator, but otherwise share many features with a pressurised water reactor. In a BWR a steam dryer may be required inside the reactor pressure vessel above the reactor core. To allow the water to boil at a useful operating temperature, the pressure in a BWR is lower than a PWR, typically 70 to 75 Bar.

To allow the reactor to start up, shut down and throttle its power over a wide range of power outputs most designs have some form of movable absorber. This is typically a movable control rod assembly. This is an assembly containing a strong neutron absorber which is moved into the core to shut it down. On a PWR this is typically achieved by containing a number of control rod drive mechanisms (CRDM) on the removable head of the reactor pressure vessel. In a BWR, to make room for the required steam dryer within the RPV, the control rods enter the reactor core from below. Therefore the CRDMs are typically connected to the reactor bottom head by, for example, a welded stub tube and flange assembly.

While the control rods are used to control reactor start up and shut down and power output during normal operation, they are also required to provide an emergency shutdown, known as SCRAM. Mechanisms to provide this function include for example electromagnets suspending the control rod, spring loaded mechanisms, or pressurised fluid storage to supply actuators which drive the control rods up in a BWR reactor if electric power is lost.

Some of the known problems with conventional control rods are listed here:

Safety Issues:

Control rods may become stuck or encounter excessive friction when they are re-inserted into the reactor. If insufficient numbers of control rods are re-inserted the reactor may not shut down. To mitigate against this control rods and their associated systems have a very high reliability requirement and associated cost, additional control rods must be added to offset the failure of single rods to re-insert. In many designs a secondary shut down system is required as the control rods cannot be relied upon to function.

Control rods may be ejected from the reactor, a structural failure above the control rod drive may cause steam/water to leak out of the reactor. The pressure differential between the leak point and the control assembly in the reactor can therefore cause the rod to be lifted out of the reactor very rapidly. This fault is mitigated by rapidly shutting the reactor down, this requires complex and expensive instrumentation to trigger this function.

The control rods may be spuriously commanded to lift. In certain cold or low temperature conditions doing this would potentially result in the reactor going prompt critical, such an occurrence could potentially destroy the core the reactor vessel and many of the cooling systems. To prevent this from happening expensive high integrity control systems and procedures must be used.

The control rod assemblies create a considerable increase in the surface area of the primary pressure boundary, as each control rod housing has multiple welds it also greatly increases the number of potential failure points. The control rod housings are typically only a few mm thick and therefore must be protected from missiles and other internally or externally generated hazards.

Cost and Complexity:

In a typical control rod scheme a control assembly will occupy one fuel assembly and be controlled by one control rod drive mechanism (CRDM). A typical reactor will have between 30-100% of the fuel assemblies with a control assembly. As can be seen in FIG. 1 these CRDM's and these associated housings add up to a considerable volume of equipment attached to the upper head of the reactor vessel.

The CRDM are safety significant and as such represent a significant cost on their own. They will also tend to be individually wired to high voltage power electronics mounted outside of containment. The CRDM are therefore a significant cost in relation to the total cost of the primary circuit.

The CRDM housing as described above are numerous and relatively fragile while being on the pressure boundary. As a result, they require extensive justification and in-service inspection and maintenance.

Reactivity Control:

Control rods are relatively space inefficient at shutting down the reactor core as they are dense absorbers concentrated in limited portions of the core. As a result if the reactor is being operated as a soluble boron free plant the number of control rods required is significant, potentially 80-100% of the fuel assemblies will require a control assembly. As previously discussed the CRDM are both expensive and bulky, providing a CRDM for every position is expensive and complex.

Layout:

The control rod system applies considerable constraints to the layout of the reactor. The control assembly requires a space at least as large as the core within the pressure boundary into which it can retract. The control assemblies also have a long drive rod which is needed to pass motion between the CRDM and control assembly in the core.

The CRDM are conventionally mounted on the outside of the pressure boundary. This allows them to have electrical connections and electro magnets with relatively conventional materials, or hydraulic pistons and controls. If the CRDM is mounted inside the pressure boundary, high temperature insulation is needed for the electromagnets along with high temperature and pressure resistant encapsulation for the electrical connections, cost is likely to increase by an order of magnitude in addition to adding technical and operational risk.

The need to have such a long train of equipment means that the head of the reactor on typical PWR plants weighs hundreds of tonnes. Were a more flexible system employed this space could be used to locate other parts of the plant such a fluid connections, the pressuriser or heat exchangers or steam separators.

On a BWR steam separators must be located above the core, therefore the control rods are located beneath the core, this means that the space to retract the control assemblies is located beneath the core raising its position in the vessel. The CRDM's must therefore penetrate the bottom of the vessel meaning that their design must have a high level of integrity as any leaks could drain the RPV. Additionally, gravity cannot be used to insert the rods and they are generally inserted using stored energy in a hydraulic accumulator or with system pressure.

The entire control rod mechanism is complex and requires regular attention. The control rod drive mechanism in traditional PWR reactors is usually combined with the pressure vessel head, requiring careful handling whenever the head is removed. Maintenance of the CRDM in BWR reactors has been said to be one of the highest dose, most physically demanding, and complicated maintenance activities routinely accomplished by BWR utilities.

In "Nuclear Naval Propulsion", Magdi Raheb 2011, the S7G experimental reactor is discussed. "The S7G core was controlled by stationary gadolinium-clad tubes that were partially filled with water. Water was pumped from the portion of the tube inside the core to a reservoir above the core, or allowed to flow back down into the tube. A higher water level in the tube within the core slowed down the neutrons allowing them to be captured by the gadolinium tube cladding rather than the uranium fuel, leading to a lower power level. The design constituted a unique fail-safe control system. The pump needed to run continuously to keep the water level pumped down. Upon an accidental loss of pump power, all the water would flow back into the tube, shutting down the reactor." The S7G prototype design was a land-based nuclear reactor that did not use solid control rods. It was tested in the late 1970s and early 1980s. No practical details of this have been disclosed other than the basic working principles.

A need therefore exists to improve the control mechanism for all types of nuclear reactor. Improving reliability, reducing maintenance requirements, simplifying the mechanism, are all desirable attributes of a reactor control design.

SUMMARY OF THE INVENTION

According to a first aspect there is provide a reactor control system for a nuclear reactor, the reactor control system comprising: one or more hollow tubes comprising neutron absorbing material, each having a first end and a second end; a pump connected to the first end of each hollow tube and operable to control the amount of a first fluid within the hollow tube, the first fluid comprising a neutron moderator, wherein: the pump is controlled based on a level of reactivity in the nuclear reactor, and the second end of the hollow tubes is in fluid communication with a second fluid, the second fluid having a neutron moderating capacity lower than 10% of that of the first fluid.

Optionally the first fluid is water and the second fluid is steam. Other fluids may be used providing the first fluid provides a strong moderating effect and the second fluid has a lower capacity for moderation, e.g. less than 10% of the first fluid, or 5% of the first fluid, or less than 1% of the first fluid.

The reactor control system may provide means to rapidly fill the tubes with a third fluid. The third fluid may comprise the first fluid and an additional neutron absorber. Or the third fluid might be another neutron absorbing fluid that can be injected into the tubes to suppress reactivity of the reactor core.

The reactor control system further may comprise a control orifice between the hollow tube and the pump, wherein the control orifice is in fluid communication with a reservoir of the first fluid. As described below, the control orifice allows a portion of the first fluid to be drawn into the tube by the pump, creating a calibrated pressure drop across the orifice. The allows the pump speed to be controlled to maintain a required pressure drop in the tube, while still maintaining a fluid flow rate. This allows the pressure drop to be controlled based on flow rate, and therefore the height of fluid in the tubes to be controlled based on flow rate at the pump.

The second end of the hollow tube may be in fluid communication with a steam space, the steam space being in fluid communication with a reactor pressure vessel of the nuclear reactor. For example, in a BWR the second end of the tube may be above the steam driers within the pressure vessel. When the steam space is at equal pressure with the pressurised water in the reactor vessel, the pump only needs to provide sufficient head to adjust the water level in the tubes without overcoming the pressure within the reactor.

The pump may be fitted with a mechanism to stop the pump controlling the amount of the first fluid rapidly in response to a signal, for example by stopping the pump from turning, comprising one or more of: brakes on the motor shaft, magnetic coupling between the impeller and the shaft, braking resistors in a pump power controller, additional valves or fluidic devices operable to allow additional fluid into the absorber tubes.

The reactor control system may comprise an interlock system to prevent the pump reducing the amount of the first fluid within the hollow tubes until a moderator temperature of the nuclear reactor has reached a predetermined threshold temperature. In reactors such as a light water reactor, where water temperature provides a reactivity control mechanism, it may be undesirable to reduce the control effect of the absorbers until the water has reached the normal operating temperature. The interlock system thus prevents control excursions being possible by the withdrawal of the control mechanism before the equilibrium operating temperature is achieved.

The reactor control system may comprise one or more sensors operable to provide a measure indicative of the depth of fluid in the tubes, and wherein the pump is controllable to maintain a required depth of fluid at a predetermined level. The sensors could be a fluid height sensor such as a radar sensor or optical sensor. The sensors may be pressure sensors that measure the water pressure in the tubes.

One or more tubes may comprise the absorbing material in a portion of its length such that when the tubes are fitted to a core of the nuclear reactor, the reactivity of a first portion of the core can be controlled independently to a second portion of the core. Different tubes may comprise absorber in different positions, or one or more tubes within a fuel assembly may comprise absorber at different positions to other tubes within the same fuel assembly.

The tubes may have a rectangular or box shaped cross section.

When there are more than one hollow tubes, the reactor control system may comprise a many to one connecting manifold, the connecting manifold operable to provide a fluid connection between more than one of the hollow tubes, and an outlet pipe within the reactor. The manifold may form a structural part of a core support of the nuclear reactor so as to provide both structural support to the core itself and the assemblies within the core.

The manifold may additionally serve to locate the fuel rods of the fuel assembly.

In another aspect of the invention, a fuel assembly for a nuclear reactor is provided, the fuel assembly comprising: one or more fuel rods of fissile material; one or more hollow absorber tubes comprising neutron absorbing material, for example gadolinium.

There may be more than one hollow tubes, and the fuel assembly may comprise a many to one assembly manifold, the manifold operable to provide a fluid connection between more than one of the hollow tubes, and an outlet pipe of the fuel assembly.

Another aspect of the invention is a method of controlling a nuclear reactor, the method comprising providing hollow absorber tubes comprising neutron absorbing material within a core of the reactor, and controlling the amount of a moderating fluid within the hollow tubes to maintain a desired level of reactivity of the core.

The present invention may comprise or be comprised as part of a nuclear reactor power plant (referred to herein as a nuclear reactor). In particular, the present invention may relate to a light water reactor (LWR), such as a pressurised water reactor (PWR) or boiling water reactor (BWR). The nuclear reactor power plant may have a power output between 250 and 600 MW or between 295 and 550 MW.

The nuclear reactor power plant may be a modular reactor. A modular reactor may be considered as a reactor comprised of a number of modules that are manufactured off site (e.g. in a factory) and then the modules are assembled into a nuclear reactor power plant on site by connecting the modules together.

The nuclear reactor of the present disclosure may be a pressurised water reactor and comprise a primary circuit comprising a reactor pressure vessel; one or more steam generators and one or more pressurizers. The primary circuit circulates a medium (e.g. water) through the reactor pressure vessel to extract heat generated by nuclear fission in the core, the heat is then to delivered to the steam generators and transferred to the secondary circuit. The primary circuit may comprise between one and six steam generators; or between two and four steam generators; or may comprise three steam generators; or a range of any of the aforesaid numerical values. The primary circuit may comprise one; two; or more than two pressurizers. The primary circuit may comprise a circuit extending from the reactor pressure vessel to each of the steam generators, the circuits may carry hot medium to the steam generator from the reactor pressure vessel, and carry cooled medium from the steam generators back to the reactor pressure vessel. The medium may be circulated by one or more pumps. In some embodiments, the primary circuit may comprise one or two pumps per steam generator in the primary circuit.

In some embodiments, the medium circulated in the primary circuit may comprise water. In some embodiments, the medium may comprise a neutron absorbing substance added to the medium (e.g., boron, gadolinium). In some embodiments the pressure in the primary circuit may be at least 50, 80 100 or 150 bar during full power operations, and pressure may reach 80, 100, 150 or 180 bar during full power operations. In some embodiments, where water is the medium of the primary circuit, the heated water temperature of water leaving the reactor pressure vessel may be between 540 and 670 K, or between 560 and 650 K, or between 580 and 630 K during full power operations. In some embodiments, where water is the medium of the primary circuit, the cooled water temperature of water returning to the reactor pressure vessel may be between 510 and 600 k, or between 530 and 580 K during full power operations.

The nuclear reactor of the present disclosure may comprise a turbine circuit comprising circulating loops of water which extract heat from a primary circuit in steam generators, or from the reactor core within the reactor pressure vessel, to convert water to steam to drive turbines. In embodiments, the turbine circuit may comprise one or two high pressure turbines and one or two low pressure turbines. In some embodiments the reactor may be a BWR and the steam turbines may be driven by steam generated in the reactor pressure vessel which itself forms part of the turbine circuit.

The turbine circuit may comprise a heat exchanger to condense steam to water as it is returned to the steam generator or reactor pressure vessel. The heat exchanger may be connected to a tertiary loop which may comprise a large body of water to act as a heat sink. The reactor vessel may comprise a steel pressure vessel, the pressure vessel may be from 5 to 15 m high, or from 9.5 to 11.5 m high and the diameter may be between 2 and 7 m, or between 3 and 6 m, or between 4 to 5 m. The pressure vessel may comprise a reactor body and a reactor head positioned vertically above the reactor body. The reactor head may be connected to the reactor body by a series of studs that pass through a flange on the reactor head and a corresponding flange on the reactor body.

The reactor pressure vessel and associated plant may be housed within a containment structure to retain steam from the water circuit in the event of an accident. The containment may be between 15 and 60 m in diameter, or between 30 and 50 m in diameter. The containment structure may be formed from steel or concrete, or concrete lined with steel. The containment may house one or more lifting devices (e.g. a polar crane). The lifting device may be housed in the top of the containment above the reactor pressure vessel. The containment may contain within or support exterior to, a water tank for emergency cooling of the reactor. The containment may contain equipment and facilities to allow for refuelling of the reactor, for the storage of fuel assemblies and transportation of fuel assemblies between the inside and outside of the containment.

The power plant may contain one or more civil structures to protect reactor elements from external hazards (e.g. missile strike) and natural hazards (e.g. tsunami). The civil structures may be made from steel, or concrete, or a combination of both.

Embodiments of the invention will now be described by way of example with reference to the accompanying drawings in which.

Figure 8:
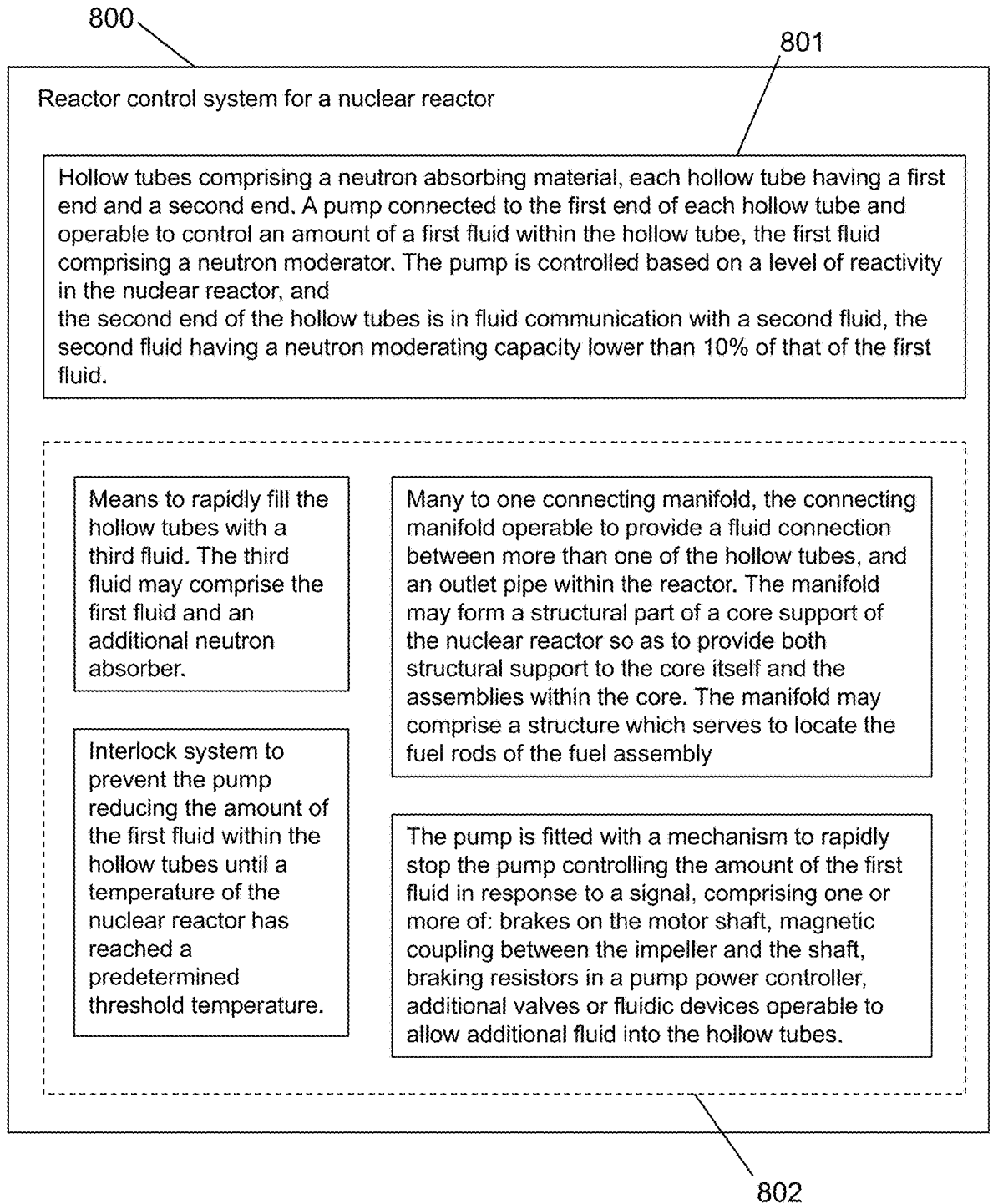

FIG. 8 shows schematically required features 801 and optional features 802 of an example reactor control system 800 for a nuclear reactor.

DETAILED DESCRIPTION

Figure 1:
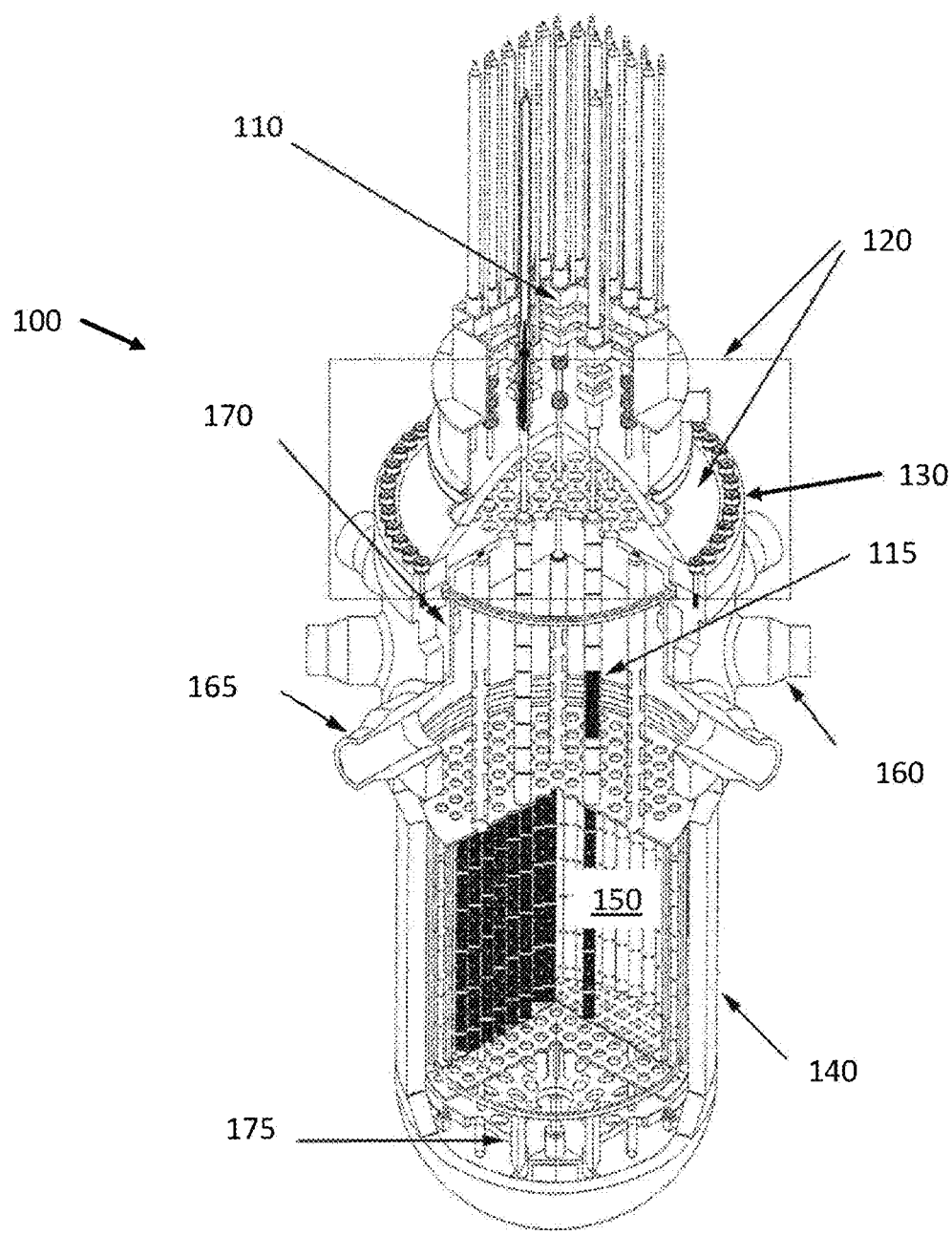
FIG. 1 is a schematic diagram of a prior art PWR.

FIG. 1 shows a prior art pressurised reactor vessel 100 for use in a nuclear power generation system, in the example shown of the pressurised water reactor (PWR) type. The reactor vessel 100 has a removable closure head assembly 120 which is an integrated head package (IHP) having a closure head 130 for closing an upper opening in the reactor vessel body 140 thereby sealing the fuel assemblies/reactor core (150) in a cavity within the reactor vessel body 140. The IHP further comprises multiple control rod drive mechanisms (CRDM) 110 within a shroud (not shown). Control rod drive shafts 115 link the control rods to the CRDMs. Also shown are the inlet nozzle 160, outlet nozzle 165, core barrel 170 and core support 175. As can be seen, the CRDMS are attached to the integrated head package, requiring careful handling whenever the head is removed.

Figure 2:
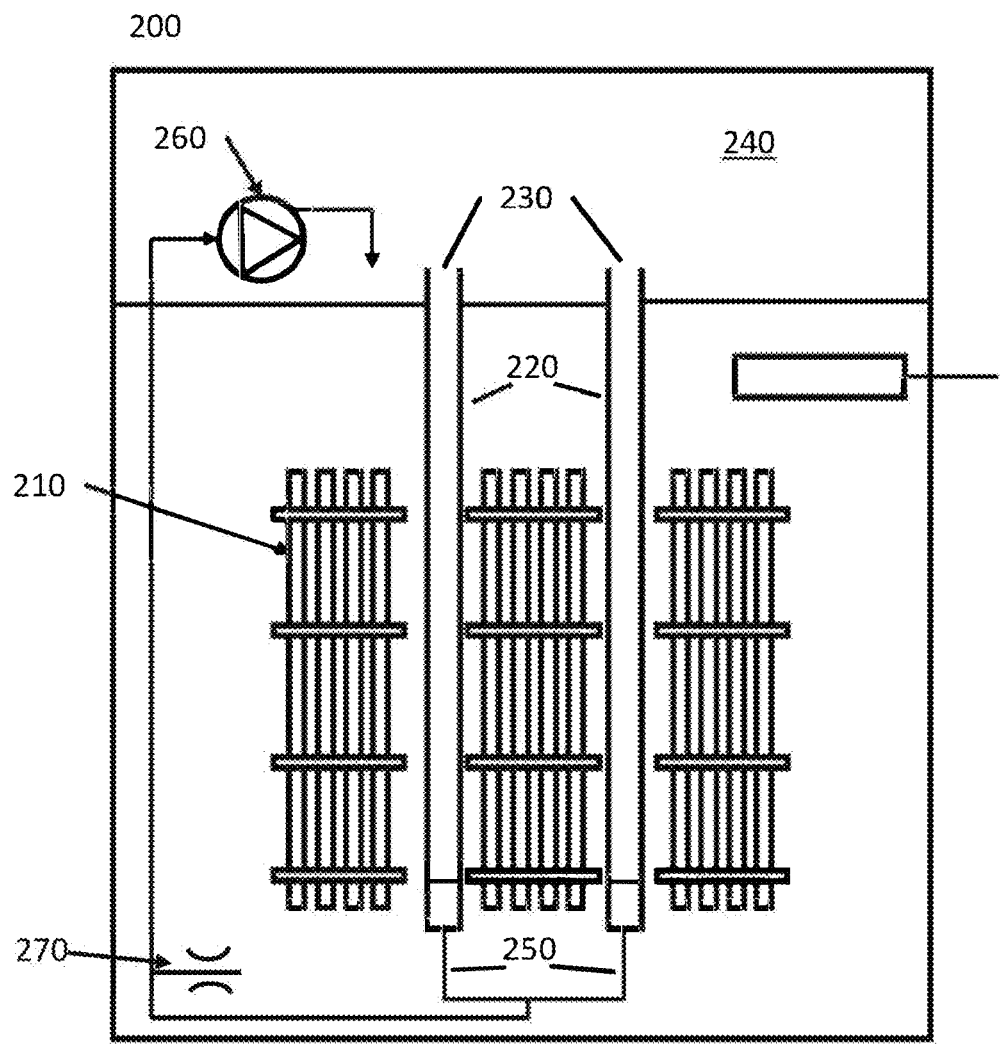
FIG. 2 shows an example of the present invention.

FIG. 2 shows schematically a light water reactor according to an embodiment of the invention. A Light Water Reactor 200 has fuel assemblies 210 containing fuel pins of fissile materials. Within the core are hollow absorber tubes 220, which have gadolinium or any other neutron absorber which has a significantly higher neutron capture cross section for thermal neutrons than fast neutrons. These tubes may be located so that an open top end of the tube 230 is located in a space within the primary circuit containing steam 240. The bottom of the tubes may be connected to a network of pipes 250, which is connected to a pump 260. The absorber tubes may be connected to the pins of fissile material in the fuel assemblies such that each fuel assembly can be removed from the core as a unit comprising the fuel pins and the absorber tubes. Variations in layout are contemplated, providing that one end of the tubes is connected to a first fluid that strongly moderates neutrons, and the second end of the tube is connected to a second fluid that has far lower neutron moderating capacity. For example, the second fluid may have a much lower density than the first fluid, for example steam, or the second fluid may have a much lower neutron moderation cross section, such as nitrogen, or both.

Tube in this specification refers to absorber tubes unless the context makes it clear that another use is intended.

In one control condition the absorber tubes are filled with a moderating fluid, e.g. water. In the example of FIG. 2, in another condition, the pump is running so that the moderating fluid is drawn out of the tubes in the core, and it is replaced with a less moderating fluid, e.g. steam drawn from the steam space.

Alternatively, the upper ends of the tubes may be connected to a controlled source of pressurised fluid with a low moderation cross section, such as high pressure gas, for example steam, and the level of the moderating fluid can be adjusted by pumping moderator fluid out of the tubes, or by increasing or decreasing the pressure of the pressurised fluid.

Figure 3:
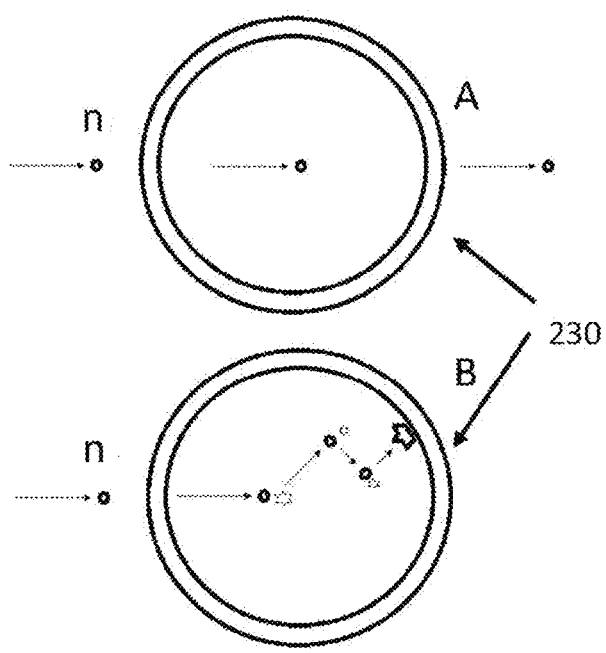
FIG. 3 shows the absorber tube when filled and empty.

FIG. 3 shows cross sections A and B of an absorber tube 230. When a high energy neutron n is released by a fission event, initially it has a low probability of absorption if it encounters the absorber tube. When the tube is filled with steam (example A) the high energy neutron has a low chance of interaction with the gadolinium in the walls of the tube both on entering and leaving the space within the tube. As it passes through the tube it is unlikely to be moderated by a hydrogen atom in the steam as steam is in the region of 1000 times less dense than water.

When the tube is filled with water, (example B), or other moderator, there is a high probability that the neutron will interact with one or more nuclei of atoms of moderator material, for example hydrogen or deuterium in water, and thus be moderated or slowed down. The typical distance a neutron travels in reactor coolant is between 3 mm and 45 mm depending on energy. The tubes may be in the range 10-25 mm in diameter. This ensures a high probability that fast neutrons will be moderated to become thermal neutrons by collisions with the water while contained inside the tubes, and therefore have a higher probability to be absorbed by the absorber before leaving the tube.

Each time a neutron interacts with a hydrogen nucleus it loses velocity in an elastic collision with the proton in the hydrogen nucleus (which is of similar mass to the neutron). As the neutron loses energy the chances of it being absorbed as it passes out of the tube will be increased. The absorbing material in the tube has a higher absorption cross section for neutrons at lower neutron energy, for example thermal neutrons with a speed around 1200 m/s.

Figure 4:
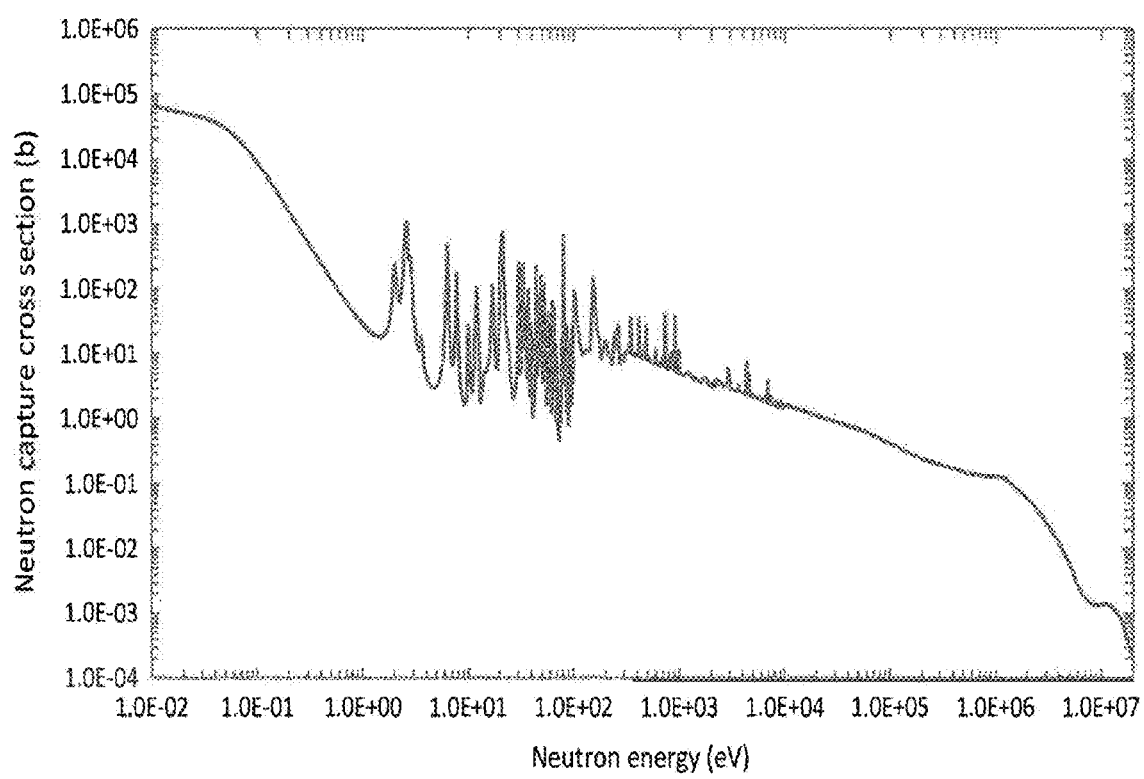
FIG. 4 shows a graph of neutron absorption cross section plotted against neutron energy.

FIG. 4 is a graph of neutron absorption cross section in barns (y axis) plotted against neutron energy in MeV (x-axis) for a suitable neutron absorbers. The graph shows that there is a logarithmic relationship between neutron energy (x axis) and the chance of them being absorbed (y axis). It can be seen that with lower energy neutrons, e.g. thermal neutrons, this effect is stronger, particularly with gadolinium (Gd). Cadmium (Cd), hafnium (Hf) or boron (B) are other strong neutron absorbers which might be used. The skilled person will understand that any neutron absorbing material that can be incorporated into a tube and has a higher absorption cross section for thermal neutrons than fast neutrons could be used. The neutron absorbing material may be used to form the tube, or formed into an alloy or composite which is used to form the tube. Alternatively, the neutron absorbing material can be incorporated into spaces formed in the walls of the tube.

Thermal neutrons will be those with an energy around 0.025 eV, or the average energy of neutrons after moderation down to thermal equilibrium with the moderator. Fast neutrons are those with an energy around 1 MeV as produced by fission. The neutron absorber will have a neutron absorption cross section that is an order of magnitude higher than the fission cross section of the fuel for thermal neutrons, and an order of magnitude lower than the fuel for fast neutrons. The skilled person will understand how to calculate the mass and cross sections of neutron absorbers required to match a particular reactor core design.

Returning to FIG. 2, a control orifice (270) may be inserted between the core and the pump (260). The control orifice is inserted in the pipework to prevent the pump from sucking the steam or other low moderation fluid all the way to the pump impeller which would most probably result unfavourable flow reversals. The suction of the pump prevents the water passing through the control orifice from flowing back down the pipe and into the absorber tubes. When the pump is switched off water may flow back into the absorber tubes via the control orifice and via reverse flow through the stationary pump. By matching the pressure drop across the control orifice under operating flow conditions with the pump pressure curve, the fluid height in the tubes when the pump is operating can be set.

Instead of or in addition to a control orifice, the pump pressure and therefore the amount of moderator fluid in the tubes may be controlled by variable control of the pump, for example a variable speed drive (VSD). A sensor may be provided to measure the pressure in the pipe or the depth of fluid in the tubes and the pump may be controlled to achieve a required depth of fluid. In this variation it is possible to use a liquid moderator that is different to the moderator in the reactor core.

It may be advantageous to slow the pump rapidly when required to allow water to flow back in rapidly. For example, during an emergency reactor shut down or SCRAM.

Features to allow the pump to slow down rapidly include but are not limited to; magnetically decoupling the pump motor from the pump impeller when the motor current is lost, brakes on the motor shaft which are held open by electro magnets and thus close when current is cut. A power controller, such as a variable speed drive (VSD), may be used to drive the pump, and braking resistors in the power controller may be used to absorb the induced current in the pump electrical circuits when the pump is switched off, and dissipate energy as heat to stop the pump rapidly.

The system may be designed with additional valves or fluidic devices which allow additional flow into the absorber tubes; these may be connected to the pump circuit to allow them to function as the pump power is lost. For example, a solenoid valve that opens when the power supply to the pump is switched off would admit water into the pump circuit immediately reducing the suction in the absorber tubes and enabling them to more rapidly refill with water.

For emergency fast shutdown, further methods include spraying cold water into the steam space so that steam bubble collapses or injecting water directly into the absorber tubes from external tanks or other location in the primary circuit.

In a PWR embodiment, the steam space into which the top end of the pipe may be connected may be the steam space of the pressuriser of the whole PWR plant; this would be advantageous for packaging the whole plant into a minimum number of vessels/area.

In a BWR, the steam space may be the steam space within the RPV.

The steam space for the top ends of the pipes may also be a small dedicated space with its own electrical heaters; this would allow pressure control of the plant to be independent of the reactivity control.

The preferred design uses steam to displace water from the absorber rods. In practice other materials may be used provided that they were in gaseous form between room temperature and 350 degrees, that they do not dissolve easily into the liquid moderator, they do not generate hazardous isotopes under irradiation and they are not themselves strong neutron moderators. Nitrogen, helium, or another low neutron absorption or moderation cross section gas, may be used instead of steam. Instead of pumping water from the tubes, the gas may alternatively be injected into the top of the tubes to expel the water or other liquid moderator. In a variation, a low moderation liquid that is immiscible with the moderating fluid could be used to fill the top of the tubes.

Absorber tubes may have varying height and varying length to selectively vary absorption at different heights within the core. For example, some tubes may only comprise absorbing material in an upper portion or lower portion of the core so that the reactivity of that portion may be controlled independently. This control may be in response to a measure of fission activity, for example by neutron flux sensors.

Pump Control:

The system may be designed to make it impossible for the pump to evacuate the tubes when the reactor is cold, when the reactivity may be higher than at normal operating temperatures. A number of methods are envisaged. Firstly the pump may be have an interlock system so that it is incapable of operation below a predetermined threshold temperature, for example typical reactor operating temperatures ~300 C. This can be accomplished by mean such as:

1. De-couple or brake the pump using thermal expansion as a drive. Bimetallic effects may be used to decouple the pump or apply brakes to the rotor. Shape memory alloys which can be designed to change shape at a specific temperature may be used to make this transition happen quickly at a predetermined temperature.
2. De-couple or brake the pump utilising a curie point transition in a paramagnetic material. In this solution the change in temperature causes a paramagnetic material to be no longer attracted to a magnet, this material may be design to actuate at a specific temperature.
3. Disconnect the power connection to the pump motor by similar means.
4. Flow area restriction, the system may be designed so that the flow area limits the pump's ability to draw water through when the plant is cold, thermal expansion of core materials, curie point behaviour and water density may be used to provide these effects.

Similar methods may be used to prevent the steam space from operating thus preventing the pump from drawing steam into the tubes. Alternatively the means employed in the previous sections may be used to open flow spaces, such as valves, into the tubes which mean that if the pump is activated it will draw water through the flow spaces until the threshold temperature is achieved.

Plumbing of Assemblies:

In a typical reactor core containing absorbers, current practice is for the core to be assembled from fuel assemblies. Using fuel assemblies allows the fuel to be manufactured and delivered in easy to handle portions which reduce the risks of criticality accidents. These assemblies may also be shuffled when depleted to improve the utilisation of fissile material.

All of the following statements when made in relation to fuel assemblies are equality applicable to cores which are created as a single unit (which is in practice a single large fuel assembly).

It is envisioned that there will be a many to one relationship between the absorbers in a given fuel assembly and the connection between this fuel assembly and the pipe work which connects the absorber to the steam space and to the pump 160.

In the case of a system where the tubes of the absorbers (230) are mounted in fuel assembly it is expected that at the top and bottom of the assembly beyond the fuelled portion the absorber tubes will be brought together into a many to one manifold. This could be a pipe manifold or it could be a hollow structure made from a casting or 3-D printed element which also serves to locate the fuel pins.

Figure 5:
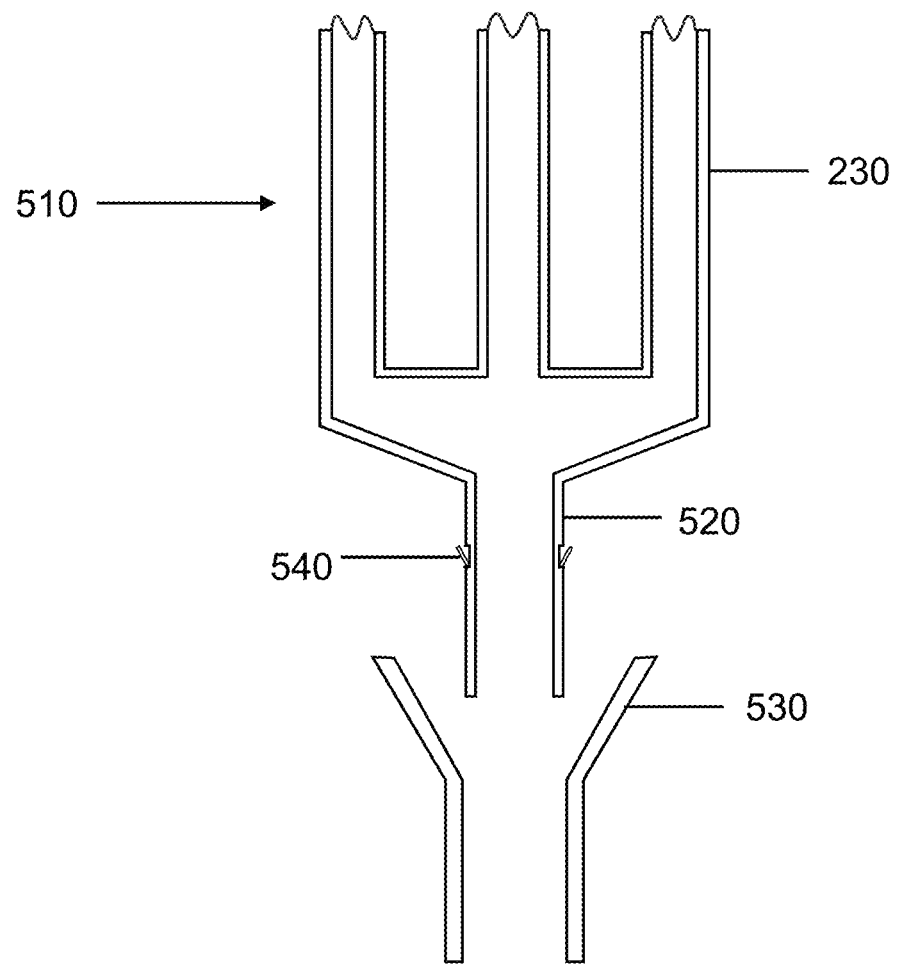
FIG. 5 shows the connection between a manifold and fluid pipe.

In these circumstances it is expected that the many to one manifold will go down to a single inlet and outlet pipe for each fuel assembly. FIG. 5 shows a diagrammatic representation of such a system. In this system there are multiple absorber tubes 230 per assembly 510 which connect to one outlet 520. The outlet in this case is assumed to be cylindrical in which case it would be used as an X/Y plant location feature, though may be other shapes which allow it to function as a rotational constraint as well as an X/Y location feature.

The outlet pipe from the absorber tube, or absorber tube manifold is configured to be received by a receiving tube when the fuel assembly containing the absorber tubes is inserted into the RPV. It is anticipated that the receiving tube will have a lead-in feature (530) to reduce the precision to which the fuel assemblies must be handled. This design also shows a flow restricting ring (540) which limits water flow into the assembly from the surrounding fluid external to the tube. As water is removed from the tube by the suction pressure of a continuously running pump the system does not need to be leak tight however inflow of water may be controlled.

Alternative means of sealing such as tight or interference fits, differential thermal expansion, compressive seals such as C seals activated by the component mass could also be used on their own or in combination.

It is envisaged that the structure which contains the piping manifold may also function as the structure which holds the mass of the core and constrains the fuel assemblies. The structure will be connected back to the pump. The pump may be similar to a BWR circulation pump in geometry, being mounted on the top of the reactor vessel rather than the bottom.

The connection at the top of the fuel assemblies is likely to be similar to the one described at the bottom however it is not as rigidly mounted to the core, being able to be moved out of the way to allow refuelling. The upper manifold will have a many to one relationship and will have a pipe connecting it to the upper steam space, or a source of pressurised gas. This upper assembly will be held in place by spring clips or other conformable methods which can deal with thermal expansions.

Alternative methods would be to give each absorber tube its own connection; this will be similar to the method of connection shown in FIG. 5. In this arrangement the many to one manifold will be located beneath the fuel assemblies rather than being part of them. The manifold will need to have sufficient flexibility to deal with assembly tolerances and thermal expansion in the core. One of the advantages of this arrangement is that different core positions may have different arrangements of pump connections allowing absorbers to be blanked off in certain locations which would enable the absorber tube, or gadolinium tube, to function as a burnable poison rather than shut down rod.

It is also anticipated that as the absorbers are depleted during service it may be desirable to replace these absorber tubes at the refuel if the absorber is depleted at a faster rate than the fissile material in the fuel assembly.

As mentioned above, a complete system may optionally include one or many manifolds, in various advantageous arrangements.

An assembly manifold in one or more fuel assemblies which connects the absorber tubes in the assembly to a connecting manifold which connects the assembly manifolds of multiple fuel assemblies together. The assembly manifold may be part of the fuel assembly and move in and out of the reactor with it. There may be an assembly manifold at both the top and bottom of each assembly. There may be a connecting manifold provided at both the top and bottom of the reactor core.

The assembly manifold which is connected with the fuel assembly may be detachable from it, for example in the fuel pool, and attachable to a fresh fuel assembly. This allows the assembly manifolds to be reused.

A connecting manifold at the bottom of the core may be located in the core support, this may be attachable to each tube individually or to an assembly manifold in each assembly. The connecting manifold in the core support may form a structural part of the core support and provide both structural support to help support the core itself and the assemblies within the core, and a fluid connection to provide the control of the moderating fluid level within the absorber tubes. The connecting manifold therefore may also function as a supporting manifold which supports the mass of the assemblies in the core (this could also be realised by the core support structures having internal passageways which may be used as part of the fluid system)

A fuel assembly may be arranged such that the connection to a connecting manifold for the individual absorber tubes provides location means for the fuel assembly, such that the fuel assembly is correctly positioned in the core.

It may also be desirable to have two or more independent absorber systems in the core. One system with a large volume of absorber tubes would be used to shut down the core. A more limited system may be used as an equivalent of a grey rod system being used to add or subtract reactivity as fuel and burnable poisons are depleted. Individual tubes positioned at different heights and horizontal positions within the core may be controlled independently to allow different portions of the core to have different levels of reactivity. Or the tubes may be the full height of the core but only comprise absorber material at different heights along the length of the tube. This may allow the burnup rate of different portions of the core to be controlled so as to balance the burnout evenly throughout the core and extend the operating life of the fuel rods.

The independent absorber systems may be plumbed so that the inlet and outlets of each independent absorber system are coaxially mounted. This would reduce the effect of tolerance stack between the elements of the core when locating the assembly and simplify locating of the assemblies during re-fuel. Alternatively the inlets and outlets may also be used as an anti-rotation feature if they are not coaxial but provided adjacent to each other. It is also envisaged, for any compatible arrangement of absorber tubes, that the upward connection to the pump (5) may be located in the fuel assemblies so that inlet and outlet connections from the absorber tubes are both located at top of the assemblies. The flow control orifice (270) may be located either at the top or bottom of the assemblies so that the upward connection is either wet or dry.

One further method which may be considered is that the water/steam tubes could project upwards from bottom of the reactor core. In this arrangement the tubes would have a down comer and riser in the same tube, a connection from the tubes to the steam space would then be provided, for example steam tubes that run up the side of the core. This arrangement would mean that the reactor required no structure (other than as necessary to restrain the fuel assemblies) above the fuel assemblies, this would greatly simplify the refuelling process.

Alternative Plumbing:

The solutions in the previous section are applicable if the absorbers form part of the fuel assembly. This is not a requirement and solutions may be built where the absorbers and the fuel assemblies are separate.

As described previously the inlet and outlets of the absorber rods may be located at the top of the core. In this case the core would be placed in the reactor vessel with spaces into which the absorber rods may be located. In this embodiment absorbers would then be lowered into the core as part of a single or multiple assemblies. It is possible to envision that the absorber assembly may be integrated with the plate which holds down the fuel assemblies, the pump and steam space assemblies and even the reactor head.

In all the previously described solutions the neutron absorbers are held in the wall of the tube where steam or water is used to alter the absorption of assembly. It is also possible to have a system where the two functions are separated and a sealed tube for containing steam and water is placed inside a sleeve containing the absorber. This has the advantages that the sleeve may be replaced when the absorber is depleted without disassembling the fluid bearing portions of the system. It is also possible to design a system where the absorber tubes are not in fluid communion with the primary coolant of the reactor and are contained in a separate loop with its own motor driven pump and steam space.

Location of Pump:

It is likely that the plumbing of the system will in most case be attached to the RPV in such a way that it is not routinely moved during a refuelling operation. Basic methods of position and mounting the pump would be:

The pump is mounted on the reactor head; this allows it to be easily removed replace or maintain the system. However tolerance stack and sealing between the pump and upward leg of the system may be an issue. The power cables to the pump(s) would also potentially need to be disconnected during a refuel.

The pump connection may penetrate the RPV wall; this means that it is not disconnected when the plant is refuelled. The manufacturing complexity may be slightly greater but operational complexity would be lower.

Geometries of Absorbers:

Fluid filled tube absorber assemblies may provide a considerably greater freedom of absorber geometry that are available to conventional control assemblies which require insertion to operate, examples of this include:

1: Absorbers may be arranged with non-cylindrical geometries, plates, crosses and other geometries are possible.
2: Absorbers do not need to be linear in arrangement, for example spirals and zig-zags are possible. This could allow the fuel pins to be arranged into geometries with higher heat transfer.
3: Absorbers do not need to be homogeneous in their cross section along the vertical length of the fuel assembly. More absorber cross section may be used at the centre of the assembly than at the top or bottom.
4: Absorbers do not need to be radially symmetric around the fuel pin centre line. Assemblies may be deliberately designed to be asymmetric to allow absorption to be tailored to a specific portion of the core. On refuel assemblies may be rotated when shuffled to further optimise absorption during operation or shut down.
5: Absorbers for different purposes may be interleaved within a single fuel assembly, for example a single fuel assembly may be connected to more than one pumping circuit. Thus a single assembly may have one circuit that is connected to multiple absorbers which is used to shut the reactor down and a second circuit with a much more limited set of absorbers which is used to modify reactivity as the core ages. During outages absorber tubes may be blanked off or opened up to adjust reactivity. The subsets of absorbers may be located at different heights in the reactor core.
6: Absorbers do not need to be located in fuel assemblies themselves, the absorbers could be located in a rack between the assemblies or they could be located around the edge of the core.
7: Absorbers could have a tri-foil shape, and/or a helical structure.

The absorber tubes may be arranged within the fuel assembly which has a grid pattern, the absorber tubes occupying positions in the grid with fuel pins occupying other positions in the grid. The grid may be arranged in a square packing or hexagonal packing. Multiple fuel assemblies may be arranged to form a reactor core. The number of absorber tubes in each fuel assembly may vary between different fuel assemblies in the reactor core.

Alternatively, the absorber tubes may have a rectangular or box shaped cross section and be arranged alongside a row of fuel pins in a fuel assembly. The absorber tubes may in this way form hollow absorber plates. The ends of the plates may have transition sections which are connectable to pipes or a manifold to allow fluid connections to be made to the absorber plates. The absorber tubes may comprise a pair of rectangular or hexagonal box sections offset from one another to provide a hollow polyhedral flow space between the sections. Such a hollow polyhedral flow space between absorber plates may then surround an entire fuel assembly.

Figure 6:
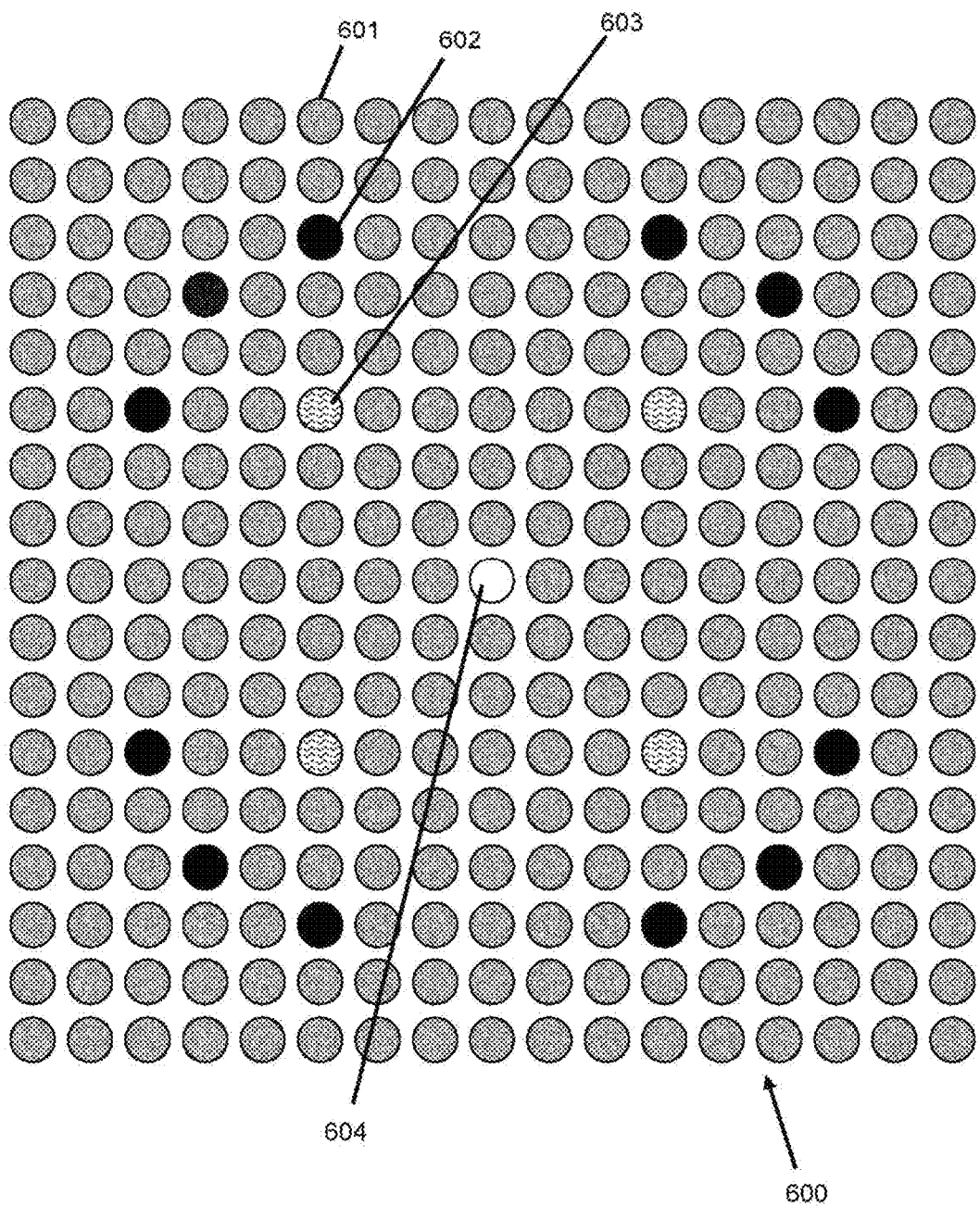
FIG. 6 shows a fuel assembly layout.

FIG. 6 shows an example layout of a fuel assembly 600, which is formed in this example of a 17×17 grid of rod guides. The grid is held together by metal banding (not shown). The grid of rod guides may for example contain: fuel rods 601, absorber tubes 602, refuelling and/or storage rods 603, and an instrumentation rod 604. Further, not all rod guides within a fuel assembly need be filled. For example, the rod guide for one or more positions may contain no rod. The instrumentation rod 604 typically contains one or more sensors, e.g. a temperature sensor, a radiation flux sensor, etc. The system disclosed herein allows the absorber tubes and fuel rods to be secure together in the fuel assembly so that they may be installed or removed together eliminating the risk of a control rod becoming detached during refuelling operations.

Figure 7:
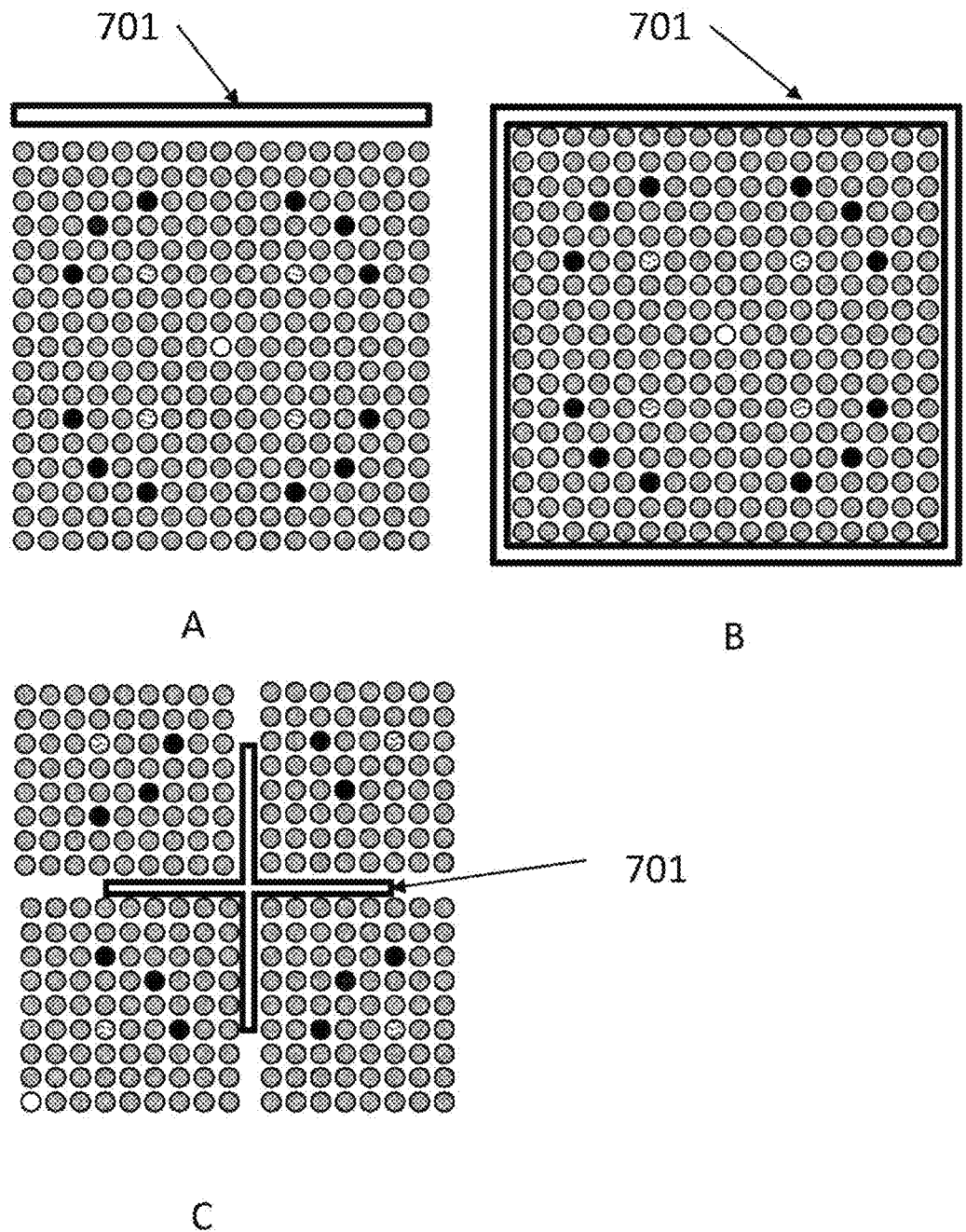
FIG. 7 shows 3 alternative fuel assembly and absorber tube layouts.

FIG. 7 shows 3 example arrangements of hollow absorber plates 701. In each example the fuel assembly comprises a plurality of fuel rods arranged in a grid. The layout is similar to as shown in FIG. 6. In 7A the absorber plate 701 has a rectangular shaped cross section, which is hollow to allow the flow of a moderator fluid inside the rectangular tube. The absorber plate may be attached to the fuel assembly so that the fuel rods and absorber tubes may be inserted or removed from a reactor as a single unit. In 7B the absorber tube is formed from a pair of rectangular tubes with a hollow space between to allow the flow of moderator fluid. In 7C the absorber plate 701 is formed into a hollow cruciform shape which may be placed in the space between adjacent fuel assemblies. The fuel assembly may contain instrumentation rods or additional absorber tubes.

An absorber located around the core between the core and a neutron reflector could be used to block neutrons from the reflector mounted outside of it. In reactor designs where criticality is maintained by the neutron reflector this would have a very high control authority for shutting down the plant.

Methods to Shut the Plant Down Passively:

In a conventional control rod (prior art) the power may be removed from the CRDM's to enable them to drop under gravity. This is controlled by the electronics control and instrumentation (EC&) triggered reaction to a sensor reading, by a failure in the EC&I system or by operator action.

Any of the following methods may be used alone or in combination to cut the output of the pump and allow water to flow into the tubes. Other methods may be used to have the system passively react to accidents.

High Temperature: The methods disclosed above, for example the use of thermal expansion of a pump shaft to prevent the pump from operating when the reactor is at insufficient temperature may be adapted with different materials selection and geometry to cause the pump to cease to operation at a high temperature threshold and allow water to flow into the absorber channels.

Low Temperature: Methods previously discussed to prevent prompt critical occurring.

Steam Leak from Pressuriser: Water level in pressuriser will rise as the water will begin to boil all over the primary circuit increasing its volume, this will cause water to overtop the steam inlet to the system causing water to flow into the absorber tubes. The height of the steam inlet over water levels will need to be selected to achieve this effect.

Reduction of System Pressure: Passive depressurisation valve opens to discharge plant pressure to allow water to be pumped into plant under gravity by safety systems. The depressurisation valve may be placed in the pressuriser to cause both over toping of the water inlet and an increase pressure differential between the control orifice (7) and the top of the absorber tube (3) causing water to be sucked into the absorbers through the control orifice against pump pressure.

Increased System Pressure: This will normally be associated with increased system temperature in which case the pump may be stopped by the methods suggested for an over temperature case.

In both above cases a passive pressure sensing circuit breaker may be used to cut power to the pump.

Reduced System Water Level: Small leaks in the plant may allow it to lose steam/water while it remains at operating pressure. In this case as the volume of water in the system drops the level of water in the pressuriser will fall. A passive float valve may be installed at the required water level to detect this situation and open a valve at a lower position to allow water to flow into the absorber tubes.

If the steam bubble in the pressuriser shrinks due to an increase in pressure, water will flow into the absorber tubes and rapidly reduce the reactivity.

Another device to shut down a pump on low water level may be an actively heated curie point valve. This valve would be connected to the same circuit as the pump so that if the pump is active current flows. The paramagnetic material is actively heated by an element (or the paramagnetic material is the element) connected to this circuit, when the valve is submerged in plant water its temperature is kept well below the curie point. When the water level drops the element is only cooled by steam and so its temperature rises above the curie point causing the paramagnetic material to no longer be attracted to the magnet. This enables a spring to open the valve, it is anticipated that the actuator for the valve (in steam) will be located some distance above the body of the valve so that water can be admitted to the tubes.

A tank containing moderating fluid may be positioned above the height of the tubes with a valved fluid connection to the absorber tubes so that moderating fluid can be injected into the absorber tubes from the tank. An additional pump may be installed along the fluid path between the tank and the tubes to drive the moderating fluid into the tubes. A source of additional absorber, such as boron, may also be provided in the tank or to the fluid connection to help rapidly reduce reactivity in emergency situations. For example, boric acid could be added to water in the tank. Alternatively, pellets of boron could be dropped into the tubes in an emergency.

The system described herein has the advantage that the position and geometry of the neutron absorbers may be tailored to achieve specific effects. The system is less complex mechanically than existing control rod systems and is also inherently safer as it is incapable of causing a criticality accident by rod ejection or spurious rod lift. The use of a liquid filled tube means that reactivity control is achieved using an inlet and outlet pipe, this allows considerably greater design layout freedom than current systems based on moving solid rods.

This reactivity control system is designed so that it is incapable of causing a reactivity insertion accident, it is not subject to rod ejection accidents (there are no rods) and passive mechanical means (thermal expansion driven brakes, clutches and valves) prevent a spurious command from taking the reactor critical when it is cold.

The system is not subject to failure cases such as stuck rods or any other issues with mechanical friction, it inherently fails safe as any malfunction causes the system to allow water back into the absorber tubes.

The removal of the ability for the control systems to add unwanted reactivity means that safety classified neutron detectors and high integrity control systems are not required.

The system is significantly simpler than a current CRDM system as it is controlled by a limited number of pumps due to the many to one relationship between absorbers and the pump(s).

The system occupies far less space than conventional control rods, which require space to retract into and then long rods to transfer motion.

The system allows absorbers to be placed where they are most effective and removed from areas where they do not need to be. For example absorbers could be placed only in the centre of the core. This is not possible with control rods which must be able to be inserted and retract.

The absorber tubes can be incorporated into a fuel assembly of fuel rods. Traditional control rods are positioned in tubes within the fuel assembly, and may fall out during handling of the fuel assembly. When the absorber tubes are part of the fuel assembly, the system may make fuel handling simpler as each assembly effectively has a control rod inserted in it. When the fuel assembly is placed in water, the absorber tube is in place preventing an unplanned criticality, which might be risk in conventional fuel assemblies if the control rod were misplaced during fuelling.

The preferred design uses steam to displace the water from the absorber rods. In practice other materials may be used provided that they were in gaseous form between room temperature at 350 degrees, that they do not dissolve excessively into water, they do not generate hazardous isotopes under irradiation and they are not strong neutron moderators or absorbers. Nitrogen or Helium would be suitable. The fluid used to displace the moderating fluid in the tubes may have a significantly lower moderating effect either by having a lower density, e.g. steam compared to water, or a neutron scattering cross section lower than 10% of that of the first fluid.

Tubes of varying height and varying length may be used to selectively vary absorption at different heights within the core. This can allow the reactivity in different portions of the core to be individually controlled to control the burnup rate of the fuel rods. For example in a BWR the burnup rate at the top of the core may be different to the bottom due to the difference in volume of steam voids present during operation While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A reactor control system for a nuclear reactor, the reactor control system comprising:
   one or more hollow tubes comprising a neutron absorbing material, each of the one or more hollow tubes having a first end and a second end;
   a pump connected to the first end of each of the one or more hollow tubes and operable to control an amount of a first fluid within that hollow tube, the first fluid comprising a neutron moderator,
   wherein:
   the reactor control system is configured to control the pump based on a level of reactivity in the nuclear reactor, and
   the second end of each of the one or more hollow tubes is in fluid communication with a second fluid, the second fluid having a neutron moderating capacity lower than 10% of that of the first fluid.

2. The reactor control system of claim 1, wherein the first fluid is water and the second fluid is steam.

3. The reactor control system of claim 1, further comprising a control orifice between the first end of each of the one or more hollow tubes and the pump, wherein the control orifice is in fluid communication with a reservoir of the first fluid.

4. The reactor control system of claim 1, wherein the second end of each of the one or more hollow tubes is in fluid communication with a steam space, the steam space being in fluid communication with a reactor pressure vessel of the nuclear reactor.

5. The reactor control system of claim 1, wherein the pump is fitted with a mechanism to rapidly stop the pump controlling the amount of the first fluid in emergency situations in response to a signal, the mechanism comprising one or more of: brakes on the motor shaft, magnetic coupling between the impeller and the shaft, or braking resistors in a pump power controller.

6. The reactor control system of claim 1, further comprising a sensor operable to provide a measure indicative of the depth of the first fluid in the one or more hollow tubes, and wherein the pump is controllable to maintain a required depth of the first fluid at a predetermined level.

7. The reactor control system of claim 1, wherein at least one of the one or more hollow tubes comprises absorbing material in a portion of its length such that when the one or more hollow tubes are fitted to a core of the nuclear reactor, the reactivity of a first portion of the core can be controlled independently to a second portion of the core.

8. The reactor control system of claim 1 wherein the one or more hollow tubes have a rectangular or box shaped cross section.

9. The reactor control system of claim 1 wherein there is more than one of the hollow tubes, and the reactor control system further comprises a many to one connecting manifold, the connecting manifold operable to provide a fluid connection between more than one of the hollow tubes, and an outlet pipe within the reactor.

10. A nuclear reactor comprising the reactor control system of claim 1.

11. The reactor control system of claim 1, wherein the pump is configured to draw the first fluid out of the first end of each of the one or more hollow tubes.

12. The reactor control system of claim 1, wherein the pump is an impeller pump.

* * * * *